United States Patent [19]
Olmstead

[11] 4,187,726
[45] Feb. 12, 1980

[54] COMPUTER PERFORMANCE MEASUREMENT DEVICE AND PROCESS

[75] Inventor: Edward A. Olmstead, Federal Way, Wash.

[73] Assignee: Black Bocs, Ltd., Federal Way, Wash.

[21] Appl. No.: 868,036

[22] Filed: Jan. 9, 1978

Related U.S. Application Data

[63] Continuation-in-part of Ser. No. 662,013, Feb. 27, 1976, Pat. No. 4,068,302.

[51] Int. Cl.² .............................................. G01N 29/00
[52] U.S. Cl. ........................................ 73/660; 364/569
[58] Field of Search ........................ 360/78; 364/569; 340/261, 683; 73/658, 660

[56] References Cited

U.S. PATENT DOCUMENTS

| | | | |
|---|---|---|---|
| 2,678,430 | 5/1954 | Loescher | 340/261 X |
| 3,351,910 | 11/1967 | Miller et al. | 364/569 |
| 3,641,539 | 2/1972 | Lesher | 340/261 X |
| 3,688,287 | 8/1972 | Perry | 340/261 X |
| 3,699,555 | 10/1972 | DuVall | 360/78 |
| 4,068,302 | 1/1978 | Olmstead | 364/200 |

*Primary Examiner*—Jerry W. Myracle
*Attorney, Agent, or Firm*—John M. Crawford

[57] ABSTRACT

A device and process for determining the performance of a computer by determining the performance of its disc information storage system. The read-write heads of the storage system are moved by a coil and armature. The acceleration and deceleration of the arm as it is moved from one cylinder to another causes the frame and cabinet of the disc information storage unit to vibrate. The device senses one or both of these vibrations. From this information the device may determine the amount of time and the percentage of total time the head is moving, the number of head movements, the average time or length of a head movement, and the relative time or length of individual head movements. These are negative indications of the time that no information transfer is occurring in the information storage system, and, therefore, of the efficiency of information placement on the discs in the storage units. The invention also includes the processes of doing these procedures.

33 Claims, 8 Drawing Figures

COMPUTER PERFORMANCE MEASUREMENT DEVICE AND PROCESS

RELATED APPLICATION

This is a continuation-in-part of my copending U.S. patent application Ser. No. 662,013, filed Feb. 27, 1976, entitled "Computer Performance Measurement," now U.S. Pat. No. 4,068,302.

BACKGROUND OF THE INVENTION

1. Field of the Invention

Measuring the activity in and the efficiency of the disc information storage units of a computer 2. Description of the Prior Art The performance of a computer is important because of its high fixed cost, its high operational cost and its potential for processing information at high speed. Poor performance, in terms of utilization, will not only result in higher operational costs through less work per unit time but also in higher fixed cost through additional equipment needed to handle the work.

Since the theoretical maximum processing capacity of a computer is difficult to determine because of the number of factors affecting it, an assumed maximum capacity is used as an indicator to determine performance. However, even on this basis, determining performance is not easy.

One way is to determine the amount of time, and therefor the percentage of time, that various electrical circuits within the computer are operating. This is done by two principal methods.

The first is to connect wires to specific probe points within these circuits. The wires are connected to external recording devices which will then show when current, and therefore information, is passing through the circuit. This is usually done by measuring the voltage drop in the circuit.

For example, an electrical circuit that would be monitored is the circuit between information storage and either the computer processing section or an external source. The greater percentage of time that information is passing through the circuit, as indicated by the current within the circuit, the better the performance of the computer.

In most large computers this information, both processable information and processing or program information, is stored on discs in an array of cylinders. The cylinders are best represented by concentric rings on the surfaces of the discs. There may be as many as five hundred cylinders of information on a disc and five thousand or more bits of information on each cylinder. Usually, a number of discs, from two to twenty, are mounted together as a unit and rotate on a single axis. There may be as many as one thousand of these units in a computing facility. Three to four hundred units are common.

For each side of a disc there is a corresponding read-write head. The head reads or carries information stored on a cylinder to the computer information processing section or to an external source, and writes or carries information either from an external source or the computer information processing section to a cylinder for storage.

Each head is mounted on an arm. The arms for a unit of discs are integral and form a comb. The comb moves all the heads together radially back and forth among the cylinders on the discs. Only information to or from a single cylinder on one side of a disc in a unit of discs may be transferred, or accessed, at any one time.

One method of determining the performance of the disc storage, and the computer, is to attach wires to the electrical circuits of the heads and determine the amount of time that current, or information, is passing through the heads.

There are a number of problems that can occur when wires are attached directly to these circuits, or directly to any electrical circuit within the computer.

The major problem is the information passing through the circuit may be changed when external wires are attached. Extraneous current from the wire may pass into the circuit and be interpreted as information by the computer information processing section or the storage system. If there is no information passing through the circuit, the extraneous current may supply information when there should be none. If there is current, or information, passing through the circuit, the extraneous current may add or subtract from the current in the circuit and change the information passing through the circuit. These changes will result in reduced performance because the information must be reprocessed. Often the computer will stop because the information or program is unprocessable.

It is also difficult to place the wires properly. Several man days are required because of the number of wires. The probe points must be located and tests made to determine whether they have been located correctly.

The possibilities for error are great when testing for performance this way.

A second method is to make a continuous record of the transactions occurring in the system. A software program is introduced into the system. The program requires that any transaction be recorded on a separate tape or disc file. The location of the transaction will also be recorded. The file is later analyzed to determine the performance of the computer. A practical problem is that the analysis occurs long after the transactions that were monitored, and the conditions within the computer and information storage system at the time of analysis may not be the same as at the time of monitoring. It is an attempt to improve the performance of a filing system after many of the old files, on which the performance evaluation had been based, have been replaced with new files.

SUMMARY OF THE INVENTION

The inventor indicated in his copending U.S. patent application Ser. No. 662,013 now U.S. Pat. 4,068,302 that it was possible to replace the positive indication of computer performance described above, with its inherent problems, with a negative indicator of computer performance that would not have these problems. He decided that detecting the movement of the read-write heads, or the comb to which they were attached, would provide useful information about the relative efficiency of the computer and the information storage system because no information is being transferred in the storage unit during head movement. The duration of the interval of movement during which no effective use may be made of the information storage device, or perhaps of the entire computer system, may vary from about 10 milliseconds to over 100 milliseconds depending upon the length of travel of the read-write head and the design of the comb. Any reduction in the time of head travel should improve the efficiency of the computer information storage system and the computer.

The read-write head is moved radially among the cylinders by a coil and armature. The acceleration and deceleration of the arm as it is moved from one cylinder to another causes the frame and cabinet of the disc information storage unit to vibrate. It is typical that the acceleration force will be much greater than the deceleration force, and the vibration caused by acceleration will have a much greater amplitude than that caused by deceleration.

The movement of the read-write head can then be detected externally of the computer information circuit by detecting the vibration of the frame or cabinet of the disc information storage unit caused by the head movement. It is now possible to obtain instantaneous information about the performance of the computer without interfering with the internal electrical circuitry of the computer system. If is, in fact, a double protection because the detector circuit has been moved from the computer information carrying circuit to the frame or cabinet of the storage unit. The detector circuit has also been changed from a direct internal connection to the electrical system of the computer and information storage system to an indirect external sensing of an event within the storage unit.

Most vibration sensing means are designed to sense and record the vibration. The present device, however, uses the vibration sensing means to sense the vibration but the recording means records the beginning of the acceleration vibrational unit. It then uses this vibrational unit to determine the head travel time in a number of ways. The acceleration vibrational unit may key the device to detect the smaller deceleration vibrational unit, and the time between the beginning of the acceleration vibrational unit and the beginning of the deceleration vibrational unit may be used to determine the total time of head travel. Another method would be used if the deceleration vibrational unit cannot be detected. The amplitude of the acceleration vibrational unit would be used to determine the total time of read-write head travel. If neither the beginning of the deceleration vibrational unit nor the amplitude of the acceleration vibrational unit can be detected then the average head travel time would be used in conjunction with the beginning of each acceleration vibrational unit to determine the amount of time the head is traveling.

The device can then determine from the vibration the discrete head movements because the beginning of an acceleration vibrational unit indicates a discrete head movement. It may also, from either the beginning of the deceleration vibrational unit or the amplitude of the acceleration vibrational unit, determine the length of time the head traveled.

This data, obtained externally of the computer electrical circuit, may be used to determine the amount of time and the percentage of time the head is moving, the number of head movements, the average time or length of a head movement, and the relative time or length of an individual head movement. Even the method using the average head travel time will give some of this information, the number of head movements, and indications of other information, the amount of time and percentage of time the head is moving.

All, or appropriate parts, of this resulting data would be recorded to provide a ready display to the operator who would use this resulting data to balance or better locate information within or being transferred to the information storage units. The present device and process would allow the operator to take corrective action close to the time the activity is being monitored. The operator would also be able to take this corrective action continually rather than occasionally after an elaborate check of the system. This would allow more efficient performance on a continuing basis.

DESCRIPTION OF THE PREFERRED EMBODIMENTS

Figure 1:
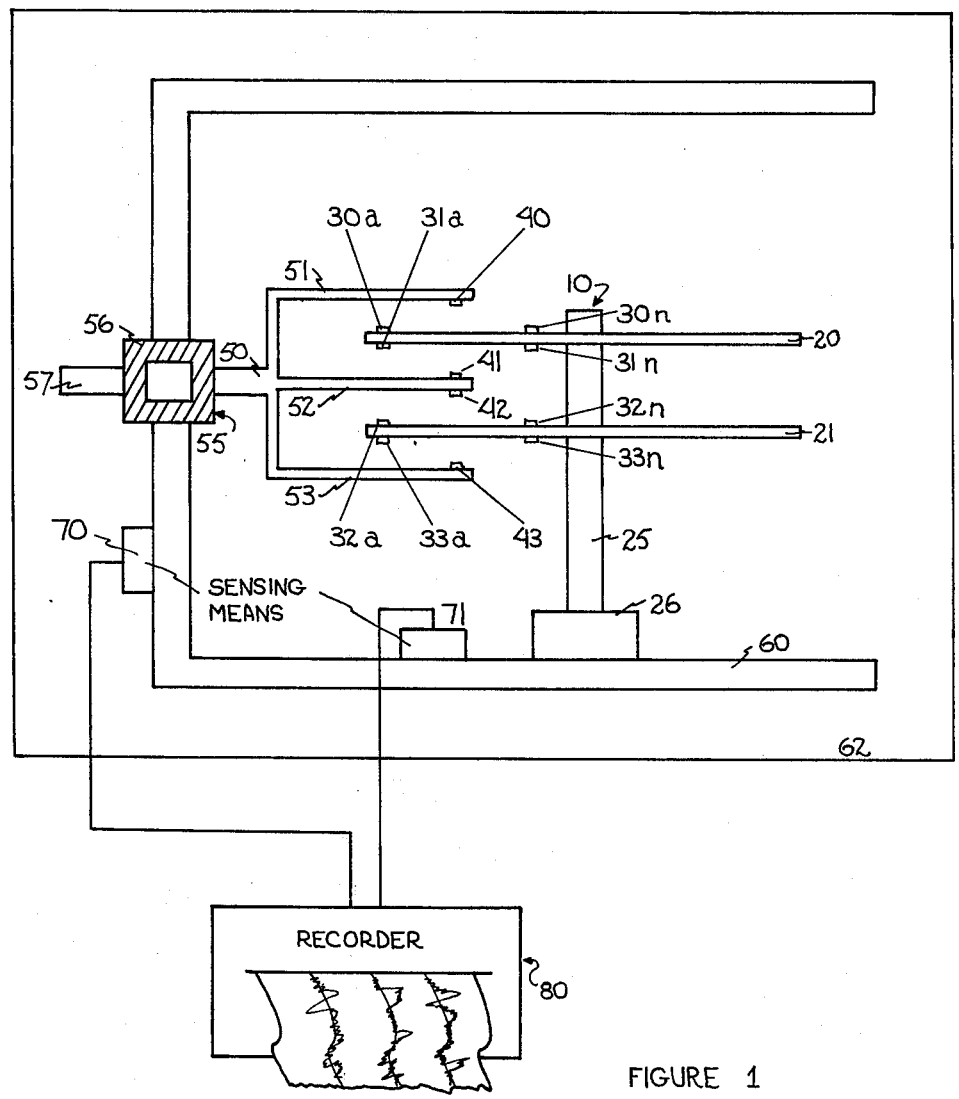
FIG. 1 shows a disc storage device with, in block diagram, a vibration detector and recording device.

FIG. 1 is a schematic diagram of a disc information storage system. For simplicity a unit 10 of two discs is shown. Discs 20 and 21 rotate on an axis 25 driven by a motor 26.

Each disc has cylinders on both its upper and lower face. Cylinders $30a$–$30n$ and $31a$–$31n$ are on the upper and lower face, respectively, of disc 20, and cylinders $32a$–$32n$ and $33a$–$33n$ are on the upper and lower face, respectively, of disc 21. As stated before, each face may have as many as five hundred cylinders.

There is also a read-write head for each face of a disc. The head accesses the cylinders to transfer information both to and from them. The head 40 is opposite the upper face of disc 20; the head 41 is opposite the lower face of disc 20; the head 42 is opposite the upper face of disc 21; and the head 43 is opposite the lower face of disc 21.

The heads are moved as a unit among the cylinders by integral arms or comb 50-head 40 on arm 51, heads 41 and 42 on arm 52 and head 43 on arm 53. Comb 50 is moved by means 55. This means is a coil 56 which moves an armature 57 attached to comb 50.

The entire mechanism is mounted on a frame 60 within housing 62. Typically, the motor 26 and coil 56 would be mounted fixedly on frame 60, and the axis 25 would be mounted rotatably on the frame 60.

Figure 2:
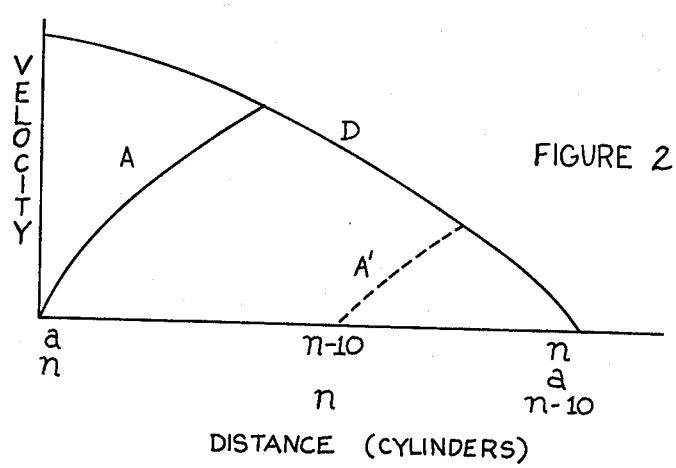
FIG. 2 is a typical acceleration-deceleration curve of a read-write head during travel.

FIG. 2 is a standard acceleration-deceleration curve of a head. The curve shows that the head accelerates rapidly at a maximum rate from a state of rest and then slows gradually to rest at the required cylinder. The slope of the acceleration curve will be the same no matter how many cylinders the head traverses in its travel. Only the time of acceleration will differ.

In FIG. 2, two different traversals are shown. The first, from cylinder a to cylinder n, has an acceleration curve A. The second, from cylinder n-10 to cylinder n, has an acceleration curve A'. The slope of curves A and A' are the same. Only the length of time required for the acceleration curve to intersect the braking or deceleration curve D differs.

FIG. 2 also shows the deceleration curve D to be the same for any traversal of the head so the slope of the curve is always the same. Again, the length of time is all that changes.

This Figure also discloses that the more cylinders that must be traversed between information transfers, the more time that will be required for head travel and the less time that will be available for information transfer. If the operator can see that the heads are moving between distantly placed cylinders and making wide traversals, he can place often used information or instructions in adjacent or close cylinders to reduce the time of arm travel and increase the efficiency of the computer storage unit and the computer.

FIG. 2 also illustrates that the acceleration-deceleration curve for a head when moving from cylinder n to cylinder a is the same as the curve from cylinder a to cylinder n; and the acceleration-deceleration curve for a head when moving from cylinder n to cylinder n−10 is the same as the curve from cylinder n−10 to cylinder n.

There is a thrust of the armature and comb 50 in an appropriate direction as the comb and heads accelerate rapidly. The reaction is this thrust is an acceleration vibration in the frame 60 and housing 62. The shape of the acceleration vibration curve will depend on the number of cylinders being traversed. The braking or deceleration force will create a less violent reaction in the frame 60 and housing 62 because it is a gentler force than the acceleration force. A second waveform is created upon deceleration because the deceleration waveform is imposed upon the acceleration waveform.

The present device is able to use the vibration of the frame 60 or the housing 62 to determine the time required for the read-write head to travel from one cylinder to another, and the number of times the read-write head moves. It does not measure the time of the vibration but the time of head travel. It can do this because of the curves in FIG. 2. The beginning of the acceleration curve and the length of the acceleration curve indicate the time required for the head to come to rest because the deceleration curve is the same for all traverses.

Consequently, the device, in its most basic form, has a means for sensing the beginning of the acceleration waveform or curve, and means for determining the time of head movement after being activated by the acceleration detection means. From this basis data, a great amount of data about performance may be derived.

Figure 3:
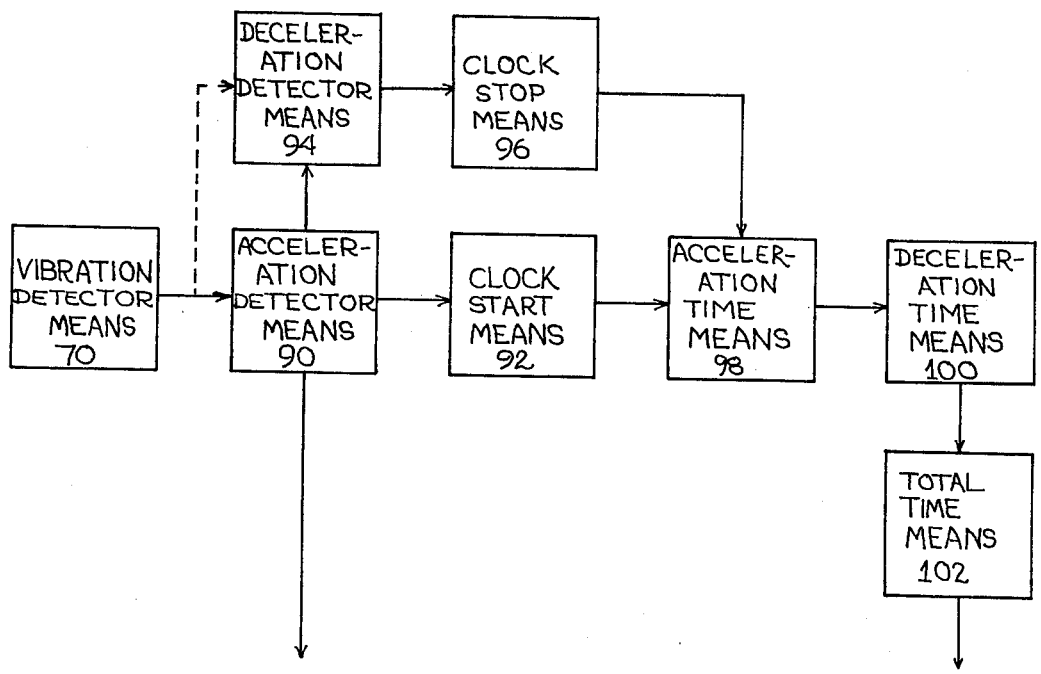
FIGS. 3-5 are block diagrams of a portion of the vibration detector and recording device showing several modifications.
Figure 4:
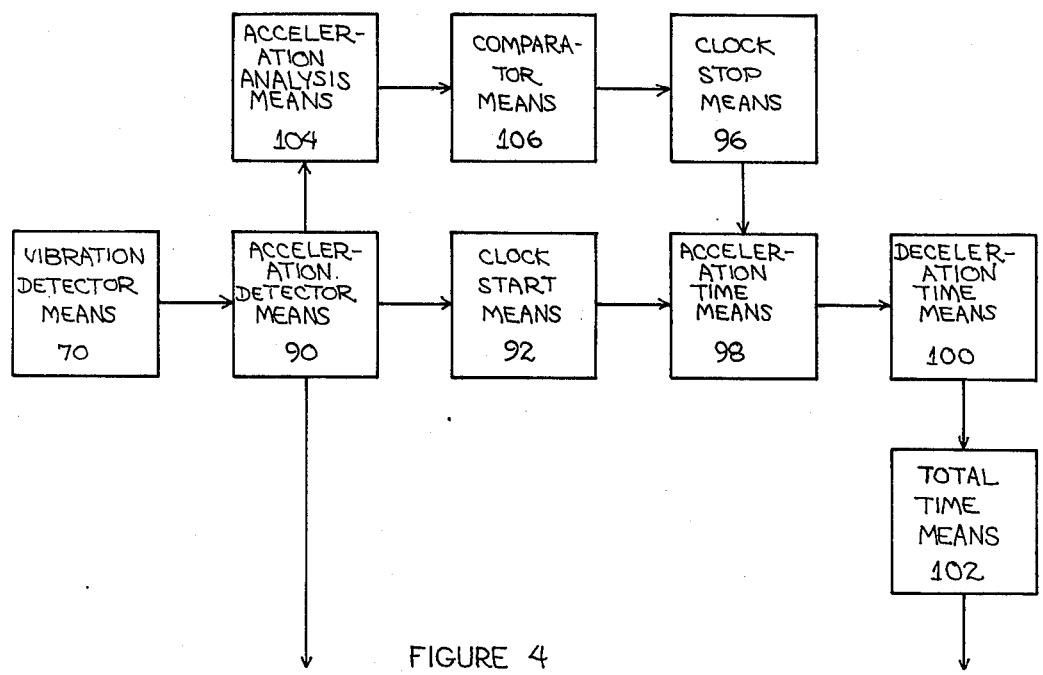
Figure 5:
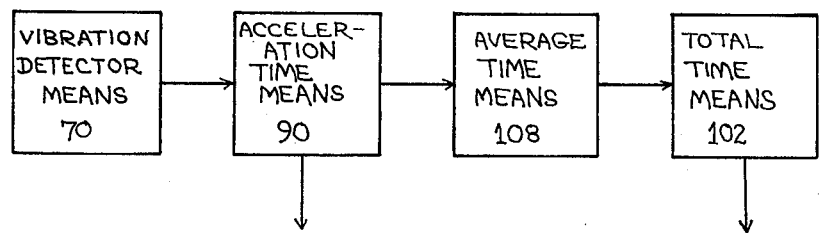
Figure 6:
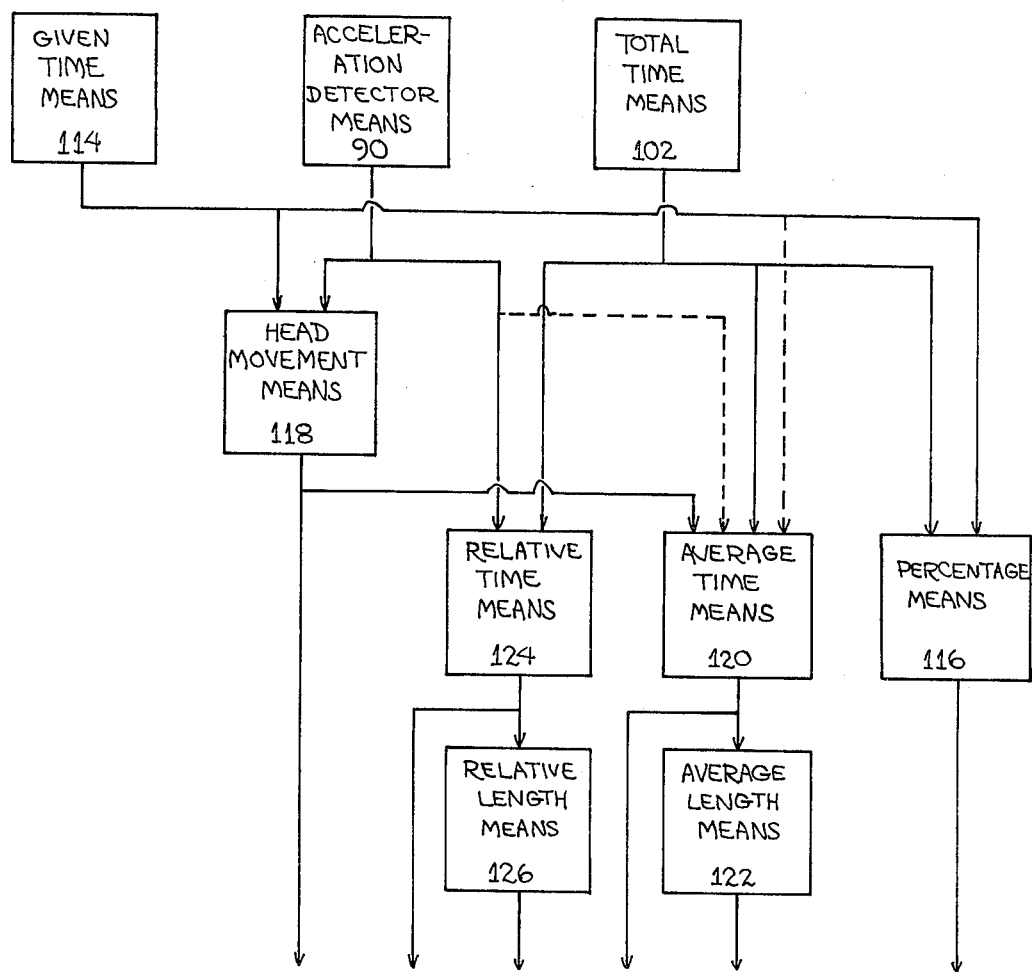
FIG. 6 is a block diagram of the rest of the vibration detector and recording device.

FIGS. 3-5 show three devices for doing the former. FIG. 6 shows a device for doing the latter.

In FIGS. 3-5, the acceleration detection means, the means for detecting the beginning of the acceleration curve or vibration, is the same. It is shown as two separate elements but it may be one. In each of these Figures the initial action is the same, the vibration detector means detects or senses a new vibration and the acceleration detector means senses or detects that this is the beginning of an acceleration curve. In other words, the vibration detector means 70 activates the acceleration detector means 90 which activates the clock start means 92. This in turn starts the acceleration time means 98.

The method of detecting the beginning of the deceleration time, or the end of the acceleration time, may differ as is shown in FIGS. 3-5. Each of these methods determines the end of the acceleration curve and allows the determination of the time of head movement, the physical function that is indicated by the vibrational unit.

In FIG. 3 a deceleration detector means detects the beginning of the deceleration curve, the curve or waveform described above. It may be activated by the vibration detector means 70 or the acceleration detector means 90, depending on whether one or two means are involved. The deceleration detector means 94 starts the clock stop means 96. This in turn stops the acceleration time means 98, giving an acceleration time. The acceleration time is passed to the deceleration time means 100, a data bank, which matches the acceleration time with a corresponding deceleration time. These two times are then passed to the total time means 102 which adds them to determine a total time of head movement. The deceleration time means 100 and the total time means 102 may be one element instead of two. The data bank could have total times instead of deceleration times and would compare a total time to an acceleration time and provide this matching total time.

FIG. 4 shows a circuit that is the same as FIG. 3 except for that portion that determines the acceleration time. The acceleration detector means 90 activates an accelerator analyzer means 104 which determines the time of acceleration. It determines the time of acceleration by determining, in conjunction with comparator means 106, when the acceleration equals zero. When this occurs, the clock stop means is activated and the rest of the circuit is the same as in FIG. 3.

FIG. 5 shows the circuit that would be used when the end of the acceleration curve, the beginning of the deceleration curve, cannot be detected. The acceleration detector 90 activates a time means 108 that matches a head movement, as determined by detector 90, with an average total time. This time is passed to total time means 102 which provides it. Again, means 108 and 102 may be a single means.

In each of these devices, the total time provided by the total time means 102 is the total time, or in FIG. 5 the average time, of the physical function, the arm or head movement, detected by the vibration detector means 70 and not the time of the vibration detected by the vibration detector.

The acceleration detector means 90 and the total time means 102 would be connected to a recorder—a graphic plotter, a counter, a light system, a computer, a minicomputer, or a tape recorder. The recorder would be placed to provide a ready display to those operating the computer facility and allow them to use the displayed data to make appropriate adjustments within the facility for improved performance. It should be understood that certain operations may be handled either by a minicomputer or by the computer itself, and the data could be provided directly to either the minicomputer or the computer. These would be programmed to use the data to both locate new information and relocate stored information to provide better computer performance.

The recorder and its associated processing equipment would both determine the time the head is in movement by counting the time of the physical function as determined by total time means 102, and the number of individual head movements as determined by the acceleration detector means 90. From this data the device may determine for a given time interval the amount of time and the percentage of total time the head is moving, the number of head movements, the average time or length of a head movement, and also, on a discrete basis, the relative time or length of individual head movements.

FIG. 6 is a block diagram of a device for doing this. Data is provided by the acceleration detector means and the total time means described above, and a given time means 114. This latter means counts the total time that has eleapsed during a given time interval.

Means 116 is connected to both the total time means 102 and the given time means 114. Means 116 compares the data received from each of these means and determines and provides the percentage of time during the given time interval the arm has been moving and not been used for information transmission.

Means 118 is connected both to acceleration detector means 90 and given time means 114. Means 118 compares the data received from each of these means and determines and provides the number of head movements that have taken place during the time interval.

Means 120 is connected to total time means 102 and either the head movement means 118 or the acceleration detector means 90 and the given time means 114. Means 120 compares the data received about the number of head movements and the total time of head movements during the time interval to determine and provide the average travel time per head movement during the time interval.

The average time of travel per head movement determined and provided by means 120 may be converted to the average length of a head movement or the average number of cylinders traversed during a head movement because there is a direct correlation between the time of head movement, the length of head movement and the number of cylinders traversed by the head during movement. If the operator needs this data, either the average length of head movement or the average number of cylinders traversed by the head or both may be provided with or in place of the average time of head movement.

Means 122 does this. It has a data bank comparing travel time with length of travel and number of cylinders traversed. It is connected to means 120 and compares the average travel time received from means 120 with the comparative data in the data bank and provides either the average travel length or the average number of cylinders traversed or both.

Means 124 is connected to acceleration detector means 90 and total time means 102. It compares the data received from these two means to determine and provide the relative time of individual head movements. Since the amount of data that could be provided would be overwhelming, the data provided would usually indicate an exception from a standard. Only exceptionally long travel times would be indicated. A specific travel time would be set and any travel time greater than that time would be indicated, for example, by a singlelight. It would light if the individual head travel time exceeded the threshold time. The term "light" is used throughout as gerneric to any type of light source including light emitting diodes.

The output of means 124 may also be converted to the length of head movement or the number of cylinders traversed. This is done by means 126. It has the same data bank as means 122. It may even use the same data bank as means 122, or the same means may be used to perform both functions. It is connected to means 124 and compares the data from means 124 with the data in the comparative data bank and provides the relative travel length or the relative number of cylinders traversed. Again, it is preferred that a single light be used and the display indicate an exception from a given standard.

The operator would also wish to know if there was no arm or head movement in a unit. This fact could be obtained directly from acceleration detector means 90, total time means 102, or relative time means 124 connected to them. A second light could display this fact. It would light if there were no output from any one of these means and remain lit if there continued to be no output.

However, it might be preferable for the operator to know if there had been no head movement during a given time interval. This would require the input from given time means 114. Consequently, means 116, 118, or 120 could also be used because these would indicate that no head movement had taken place during a given time interval. Again, a single light could be used to indicate this fact. It would light if there had been no movement during the previous time interval and remain lit during the next and subsequent time intervals if there continued to be no movement. The light would go dark following a time interval in which there had been a head movement.

From these data the operator may learn the percentage of time it is possible for the disc storage device to transmit or receive data, the number of times the arm and head had to move to access information, the average time and length of head travel, and the relative time and length of individual head movements.

Figure 7:
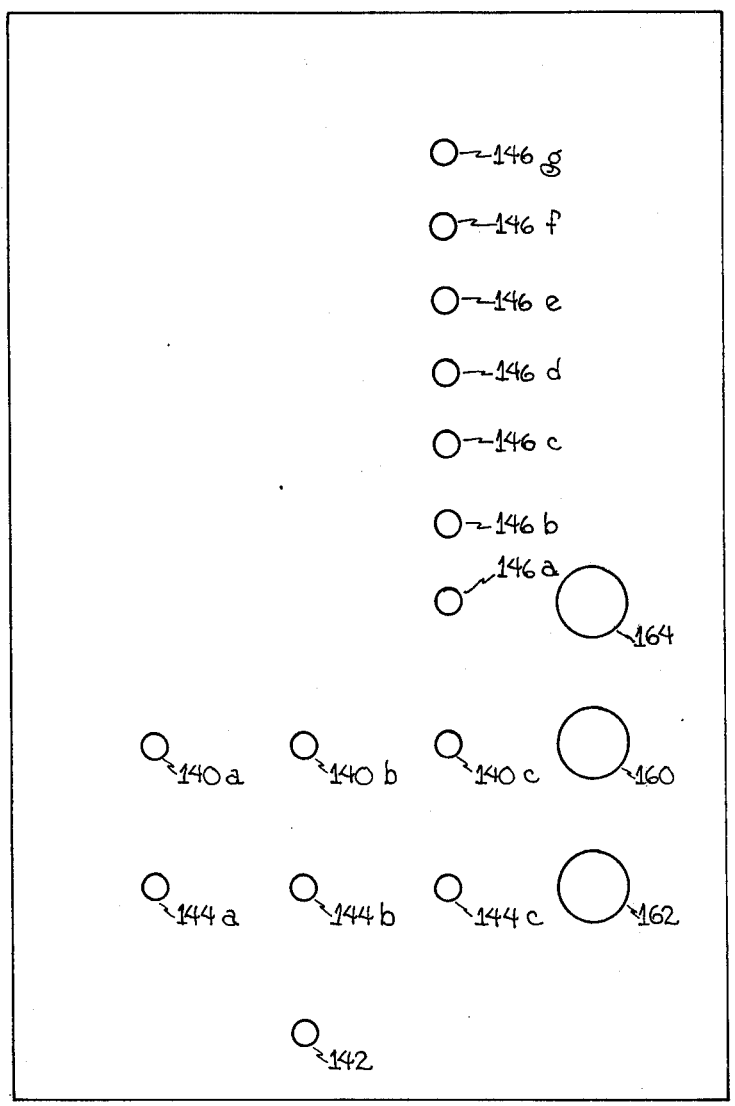
FIG. 7 is a front plan view of a recorder showing a preferred display.

One way this data could be provided would be the visual display on the recorder shown in FIG. 7. The recorder would be located centrally to provide a continuous and timely display of the data from each of the information storage units to those operating the computer facility. A central display which may be seen easily from the computer control panel is necessary in the usual multiple storage unit system of from two hundred to one thousand units.

The operator should be able to see the continuing flow of data from the information storage units, and, based on this data, make adjustments within the information storage units to improve the performance and efficiency of the system. These adjustments would include relocating stored information already on the discs, and properly locating new information being transmitted to the discs. Both of these adjustments could be within a single unit or a disc of a single unit, or among units.

The adjustments could be within a single unit if the display indicates the unit has an average or relative travel time or length that is greater than normal. This would indicate to the operator that information could be placed on the discs in the unit better than it presently is. Relocation of the information on the discs in the unit would cause less head travel time and better use and efficiency of the storage unit.

The adjustments would be among the units if the display indicated that some of the information storage units were overloaded and others were underused or not used at all. Information would then be transferred from the overloaded units to the underused or unused units to create a more uniform and efficient flow of information from and to the units. New information would be placed on underused or unused units.

However, the operator can make these adjustments only if the data is presented in an easily understood form. The amount of data that could be displayed and the speed with which it could be displayed creates a need for a simple display that can be understood quickly by the operator. Certain displays, such as numbers, require too long a time interval if the data is to be understood.

The best display appears to be one using lights. The data would be represented by one or more lights. The exact number of lights in a particular display will depend on the data being transmitted. However, there should be as few lights as possible to allow the data to be easily noted. It is possible that different colors will be used to indicate particular data or exceptions.

Central recorder 80 in FIG. 7 has a display for a single information storage unit. However, several types of displays are illustrated.

The simplest is a single light 140 which indicates an exception to normal operation. It will light if the condition being monitored exceeds a threshold figure—too great a percentage of total time being used for head movements, too many head movements, too great an average time or length of head movement, or too great a relative time or length of head movement. Each of these conditions may be indicated by individual lights, by a single light with a selector switch, or by a combination of these. The combination is considered to be best because it allows flexibility without creating an overpowering amount of data.

One combination is illustrated in FIG. 7. Light 140a indicates whether the relative time or length of an individual head movement has exceeded a threshold level. This light would have a circuit that would maintain it on long enough to be noticed. The exact predetermined time would depend upon the computer configuration and the amount of data being received. Light 140b indicates whether the number of head movements during the time interval have exceeded a threshold level. Light 140c indicates whether either the percentage of total time, or the average time or length of head movement has exceeded a threshold level. These could also be indicated by two separate lights. Light 140c is connected to the selector switch 160 on recorder 80. The switch could also be on the computer control panel.

The upper threshold means used with these lights usually would be a circuit between the determination means—the percentage means 116, the head movement means 118, the average travel time or length means 120 or 122, or the relative time or length means 124 or 126—and the display means. The upper threshold means would allow only data greater than the threshold to reach the display means.

A second light would indicate that no head movement was occurring in a unit. This could be a continuing display or be based on a time interval. This fact is indicated by light 142. It is possible that there should be a display indicating activity below a threshold level. This threshold level would be lower than the upper threshold level. In this case light 144 would be used in place of or in conjunction with light 142. It will light if the condition being monitored is below a threshold figure—too small a percentage of total time being used for head movement, too few head movements, too small an average time or length of head movement, or too small a relative time or length of head movement. Again, each of these conditions may be indicated by individual lights, by a single light with a selector switch, or by a combination of these. The combination again is considered to be best.

One combination is shown in FIG. 7. Light 144a indicates whether the relative time or length of an individual head movement is less than a threshold level. This light would also have a circuit that would maintain it lit a predetermined length of time in order to be noticed. Light 144b indicates whether the number of head movements during a time interval are fewer than a threshold number. Light 144c indicates whether either the percentage of total time, or the average time or length of head movement is less than a threshold level. This could also be done by two separate lights. Light 144c is connected to selector switch 162 on the recorder 80. This switch could also be on the computer control panel.

The lower threshold means is similar to the upper threshold means. It would usually be a circuit between the determination means and the display means. However, it would be more complex than the upper threshold means because it cannot allow all data below the threshold level to reach the display means. It must differentiate between a total datum that is below the threshold level and a total datum that is above the threshold level. The former would pass through to the display means. The portion of the latter below the threshold level would not pass through to the display means so that the total latter datum would be excluded by the lower threshold means.

The upper set of lights on the recorder 80 is optional. These provide more detailed data than the lower group of lights. For example, lights 146 a–g may indicate the maximum percentage of time the head moves during a time interval—146a, two percent; 146b, four percent; 146c, eight percent; 146d, sixteen percent; 146e, thirty-two percent; 146f, sixty-four percent; and 146g, one hundred percent. A set of lights can also be used to give detailed information about the number of head movements or the average time or length of a head movement. Again, it is possible to use individual sets of lights for each condition, a single set of lights with a selector switch, or a combination of these. In FIG. 7 a single set with a selector switch 164 is shown.

An entire set of lights need not be used. The lights can be set to display only exceptions from a normal pattern by using upper or lower thresholds. The lights would display those percentages, head movements, or average times or lengths above the upper threshold level or below the lower threshold level. However, this data could be given in more detail than the earlier single lights.

It should be understood that a light display is only one way of providing data. The recorder might have a counter or create a permanent record. This could be a continuous graph or other type of permanent or semi-permanent record. This is illustrated by the graphs in FIGS. 1 and 8. The recorder might also create a tape recording for later use.

The recorder might also be a computer means - a computer, a minicomputer, or a microcomputer—programmed to locate or relocate information within the computer information storage system appropriately and as would be required in response to the data received. This might and as would be required in response to the data received. This might be necessary in a large computer facility in which the data being received would be so extensive that it could not be understood and acted upon by the operator.

Figure 8:
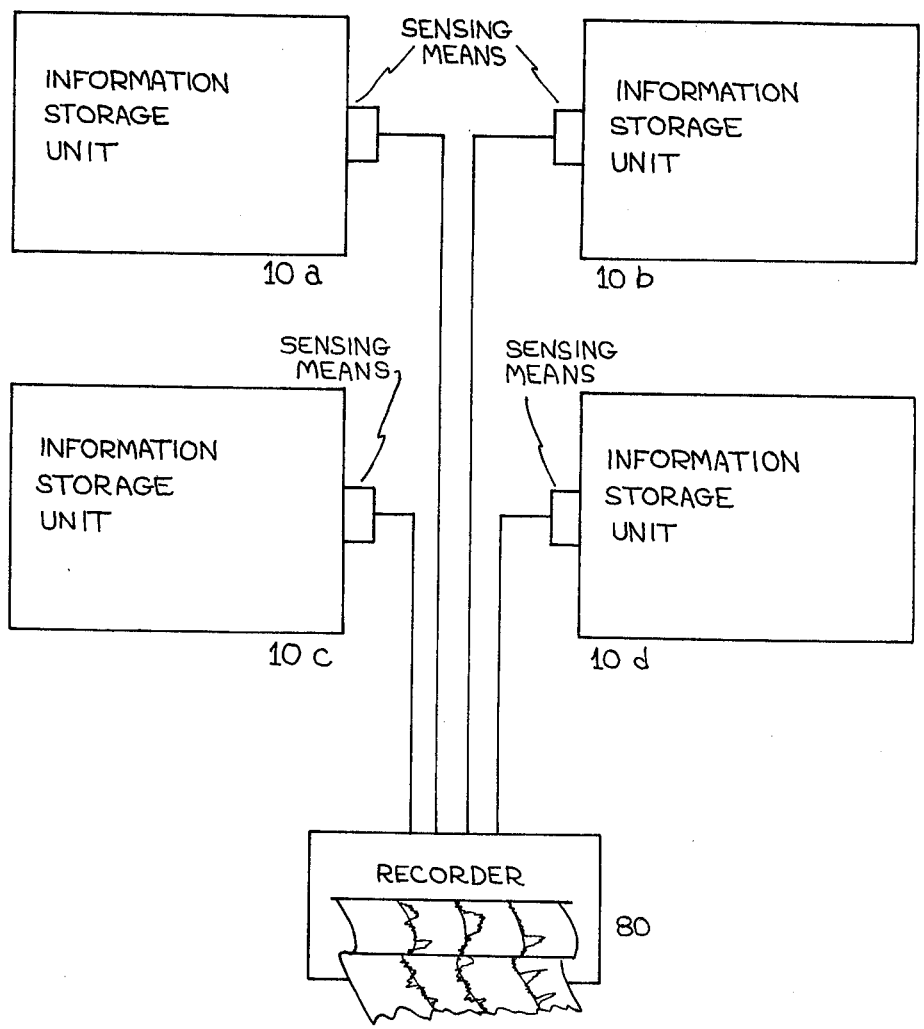
FIG. 8 is a block diagram of a typical multiple storage installation using the present system.

A portion of a multiple unit installation is shown in FIG. 8. In this Figure sensors are attached to units 10a, 10b, 10c and 10d. The sensors detect the vibration in the frame and cabinet of each of the units. This data is carried to the central recorder 80 for processing and provision in an appropriate form.

An additional means 71 is also shown in FIG. 1. This may be placed on the frame or housing to sense the vibration caused by the rotation of the discs. There may be a ten percent variation in the rotational speed of the units, and this device will tell which units rotate the fastest and which rotate the slowest. This data may be processed and displayed the same as the other data. It allows the operator to place the constantly used information on the faster rotating units and the least used information on the slower rotating units.

I claim:

1. A device for obtaining data about the performance of a disc information storage device of a computer comprising
   vibration detector means for detecting vibrational frequencies caused by a reaction to comb movement in a disc storage device, and
   acceleration detector means associated with said vibration detector means for determining from said vibration detector means the beginning of a vibrational reaction to comb acceleration detected by said vibration detector means.

2. The device of claim 1 further comprising
   recorder means associated with said acceleration detector means for indicating when the beginning of vibrational reaction to comb acceleration has not been detected by said acceleration detector means during a given time interval.

3. The device of claim 1 further comprising
   movement means associated with said acceleration detector means for determining from the output of said acceleration detector means the number of beginnings of vibrational reaction to comb acceleration in a given time interval.

4. The device of claim 3 further comprising
   recorder means associated with said movement means for providing data from said movement means.

5. The device of claim 1 further comprising
   given time means for determining the total time in a given time interval, and
   movement means associated with said acceleration detector means and said given time means for determining from the output of said acceleration detector means and said given time means the number of beginnings of vibrational reaction to comb acceleration in a given time interval.

6. The device of claim 5 further comprising
   recorder means associated with said movement means for providing data from said movement means.

7. The device of claim 1 further comprising
   deceleration detector means associated with said vibration detector means for determining from said vibration detector means the beginning of a vibrational reaction to comb deceleration detected by said vibration detector means, and
   timing means associated with said acceleration detector means and said deceleration detector means, and started by said acceleration detector means and stopped by said deceleration detector means for determining the total time of comb movement to which the vibration detected by said vibration detector means is a reaction.

8. The device of claim 7 further comprising
   recording means associated with said timing means for indicating when said time is zero.

9. The device of claim 7 further comprising
   percentage means associated with said timing means for determining from the output of said timing means the percentage of time said comb movements are occurring during a given time interval.

10. The device of claim 9 further comprising
    recording means associated with said percentage means for providing data from said percentage means.

11. The device of claim 7 further comprising
    given time means for determining the total time in a given time interval, and
    percentage means associated with said timing means and said given time means for determining from the output of said timing means and said given time means the percentage of time said comb movements are occurring during a given time interval.

12. The device of claim 11 further comprising
    recorder means associated with said percentage means for providing data from said percentage means.

13. The device of claim 7 further comprising
    relative time means associated with said timing means and said acceleration detector means for determining from the output of said timing means and said acceleration detector means the relative time of a comb movement.

14. The device of claim 13 further comprising
    recorder means associated with said relative time means for providing data from said relative time means.

15. The device of claim 14 further comprising
    upper threshold means associated with said recorder means for setting a predetermined upper relative time, and
    said recorder means providing only relative times above said upper threshold relative time.

16. The device of claim 15 in which
    said upper threshold means is in a circuit between said relative time means and said recorder means.

17. The device of claim 15 further comprising
    means associated with said recorder means for maintaining said recorder means in an activated state for a predetermined length of time once it indicated a relative time greater than said threshold time.

18. The device of claim 14 further comprising
    means associated with said recorder means for providing given data for a predetermined length of time.

19. The device of claim 7 further comprising
    average time means associated with said timing means and said acceleration detector means for determining from the output of said timing means and said detector means the average time of a comb movement.

20. The device of claim 19 further comprising
    recorder means associated with said average time means for providing data from said average time means.

21. The device of claim 7 further comprising
    movement means associated with said acceleration detector means for determining from the output of said acceleration detector means the number of beginnings of vibrational reaction to comb acceleration, and
    average time means associated with said timing means and said movement means for determining from the output of said movement means and said timing means the average time of a comb movement.

22. The device of claim 21 further comprising recorder means associated with said average travel time means for providing data from said average travel time means.

23. The device of claim 7 further comprising movement means associated with said acceleration detector means for determining from the output of said acceleration detector means the number of beginnings of vibrational reaction to comb acceleration in a given time interval, and average time means associated with said timing means and said movement means for determining from the output of said timing means and said movement means the average time of a comb movement in a given time interval.

24. The device of claim 23 further comprising recorder means associated with said average time means for providing data from said average time means.

25. The device of claim 7 further comprising given time means for determining the total time in a given time interval, movement means associated with said acceleration detector means for determining from the output of said acceleration detector means the number of beginnings of vibrational reaction to comb acceleration, and average time means associated with said timing means, said given time means, and said movement means for determining from the output of said timing means, said given time means, and said movement means the average time of a comb movement in a given time interval.

26. The device of claim 25 further comprising recorder means associated with said average time means for providing data from said average time means.

27. A method of obtaining data about the performance of a disc information storage device of a computer, said storage device having discs accessed by read-write heads on moveable combs, comprising detecting the vibrational reaction to the movement of said comb, and determining from the beginning of said vibrational reaction to comb acceleration the discrete moves of said comb.

28. The method of claim 27 further comprising determining from said comb moves the number of comb head moves during a given time interval.

29. The method of claim 27 further comprising determining from the beginning of said vibrational reaction to comb acceleration and the beginning of vibrational reaction to comb deceleration, the time said comb is moving.

30. The method of claim 29 further comprising determining from said time the percentage of time said comb is moving during a given time interval.

31. The method of claim 29 further comprising determining from said comb movement and said comb movement time the relative time of a discrete comb movement.

32. The method of claim 29 further comprising determining from said comb movement time and and the number of read-write head moves in a given time interval the average time of a read-write head movement in a given time interval.

33. The method of claim 29 further comprising determining from the comb movement time and the number of read comb moves the average time of a comb head move.

* * * * *